United States Patent
Oh et al.

(10) Patent No.: US 9,888,385 B1
(45) Date of Patent: Feb. 6, 2018

(54) METHOD FOR SUBSCRIBER AUTHENTICATION IN CELLULAR IOT DEVICE, IOT DEVICE FOR SUBSCRIBER AUTHENTICATION, AND BASE STATION APPARATUS FOR SUBSCRIBER AUTHENTICATION

(71) Applicant: KWANGWOON UNIVERSITY INDUSTRY-ACADEMIC COLLABORATION FOUNDATION, Seoul (KR)

(72) Inventors: Hyukjun Oh, Seoul (KR); Shin Hee Won, Seoul (KR); Yerin Hong, Pohang-si (KR)

( * ) Notice: Subject to any disclaimer, the term of this patent is extended or adjusted under 35 U.S.C. 154(b) by 0 days.

(21) Appl. No.: 15/384,216

(22) Filed: Dec. 19, 2016

(51) Int. Cl.
| | |
|---|---|
| *H04W 12/06* | (2009.01) |
| *H04L 29/08* | (2006.01) |
| *H04L 29/06* | (2006.01) |
| *H04W 84/04* | (2009.01) |

(52) U.S. Cl.
CPC ......... *H04W 12/06* (2013.01); *H04L 63/0876* (2013.01); *H04L 67/12* (2013.01); *H04W 84/042* (2013.01)

(58) Field of Classification Search
CPC ............. H04L 2209/24; H04L 63/0428; H04L 63/0435; H04L 63/06; H04L 63/062; H04L 63/08; H04L 63/101; H04L 9/0819; H04L 9/0869; H04L 9/3271; H04W 12/06; H04W 4/005; H04W 16/18; H04W 36/0005; H04W 48/14; H04W 48/20; H04W 4/001; H04W 4/06; H04W 76/023; H04W 84/00; H04W 8/005; H04W 8/04
See application file for complete search history.

(56) References Cited

U.S. PATENT DOCUMENTS

| | | | |
|---|---|---|---|
| 8,533,803 B2 * | 9/2013 | Cha ......................... | G06F 21/34 726/7 |
| 2016/0269386 A1 * | 9/2016 | Nix ....................... | H04L 9/0869 |
| 2017/0187807 A1 * | 6/2017 | Clernon ................ | H04L 67/125 |

* cited by examiner

*Primary Examiner* — Diane Mizrahi

(57) ABSTRACT

Provided are a method, an Internet of Things (IoT) device, and a base station apparatus for subscriber authentication without using a SIM card or a USIM card in a IoT/IosT service based on a 3GPP mobile communication system. The method of authenticating a subscriber of an Internet of Things (IoT) device based on mobile communication includes authenticating the subscriber using a measurement value which becomes a unique characteristic of the IoT device, in which the authenticating of the subscriber is performed using a measurement value which becomes a unique characteristic of the IoT device without using a SIM (subscriber identity module) card or a USIM (universal subscriber identity module) card.

13 Claims, 5 Drawing Sheets

METHOD FOR SUBSCRIBER AUTHENTICATION IN CELLULAR IOT DEVICE, IOT DEVICE FOR SUBSCRIBER AUTHENTICATION, AND BASE STATION APPARATUS FOR SUBSCRIBER AUTHENTICATION

BACKGROUND OF THE INVENTION

Field of the Invention

The present invention relates to subscriber authentication and, more particularly, to subscriber authentication in a cellular IoT (Internet of Things) device.

Related Art

IoT (Inter of Things) or IosT (Internet of small Things) is a network where things are connected and a small amount of data is transmitted without normal power using only a battery. It requires low power, low cost transmission technology, and the service can be provided without a high speed, high cost network.

IoT or IosT has a structure that thousands of or tens of thousands of terminals/devices/apparatuses are connected to a central device such as one base station, and communication systems for IoT optimized for such a feature have been developed. When a communication system for IoT can basically support such features as low power, low complexity, low costs, a low transmission rate, a wide coverage, a multiple of simultaneous connection devices and the like, the communication system can provide an IoT service.

A 3GPP mobile communication standardization organization is establishing a standard for IoT called "LTE-M" similar to LTE (Long Term Evolution) and a standard for IosT called "NB-LTE". LTE-M and NB-LTE are a 3GPP-based technology which is a global standard.

LTE-M has used category 1 UE defined in 3GPP release 8 and has added power saving mode (PSM) function defined in release 12. Since LTE-M uses LTE network which is the nationwide network, the nationwide service is possible, and since LTE-M uses the licensed communication band frequency, there is no deterioration of the communication quality due to the frequency interference and a global extension is possible.

3GPP has standardized category 0 in release 12 for more efficient IosT communication. In Release 13, category M is currently standardized and at the same time, NB-IoT is currently standardized as a clean-slate solution.

LTE-M or NB-IoT based on 3GPP standard uses a licensed band of a mobile telecommunication service provider, but SIGFOX, LoRa or the like is IosT which uses an unlicensed band. IosT needs a low power wide area network. The band of LTE-M or NB-IoT is getting narrow and the speed thereof is getting low in order to support things/small things in LTE network with the goal of a high speed broadband wireless network, and SIGFOX or LoRa is a technology with the goal of small amount of information transmission with low power from the beginning.

There are IoT services such as an automobile control service and a CCTV, but IosT is applicable to much smaller and inexpensive things and uses a very little amount of power, and thus a long time (target more than 10 years) service is possible with only an embedded battery. The service can be extended to various areas including a tracking such as a parts management and a metering such as metering electricity/water/gas.

All mobile communication systems for a wireless Internet service including IoT service or IosT service have a star topology form in which a base station and a multiple of UEs are connected, and neighbor base stations are connected by a separate interface. Such base stations and UEs form a radio access network (RAN) or an AS layer in the total mobile communication network. The base station is connected to an upper core network (CN) and the CN includes a server which makes subscriber information as a database (DB) and performs authentication.

When a UE is connected to a new base station in a mobile communication system, the UE should be authenticated whether the UE is qualified to be provided a service from the corresponding mobile communication network. There can be various methods for the authentication procedure, but the procedure is performed fundamentally based on subscriber's unique ID which is called IMSI (International Mobile Subscriber Identity) stored in a SIM card or USIM card of the UE.

In the current 3GPP LTE mobile communication system, IMSI is not directly sent for security unless CN directly requests IMSI of the subscriber, and the result value derived using IMSI as the parameter is exchanged. Here, various other parameters as well as IMSI value can be used depending on the situation.

Hence, in order to use a service in 3GPP mobile communication system, the use of SIM (subscriber identity module)/USIM (universal subscriber identity module) is essential, and the SIM card/USIM card should be independently separated for particularity and security of the mobile communication business. For reference, a permanent ID called IMEI independently exists as the unique ID of the UE. In the case of the IMEI, the user can easily know the accurate value, but in the case of the IMSI, the value is generally not open to the subscriber and only the serial number of SIM card/USIM card is open to the subscriber. For such a reason, there should be a separate memory for the SIM card/USIM card and an interface with the UE should be provided.

Hence, the SIM card/USIM card price becomes a few US dollars, and thus when purchasing IosT equipment, unconditionally a few US dollars should be spent in order to additionally purchase a SIM card/USIM card, which increases the unit price.

A subscriber authentication scheme, which is not based on SIM card or USIM card, has not been established in 3GPP standard.

In IoT communication systems, particularly IosT communication system has a UE form in which is a small sized device such as a sensor and small amount of data of that are transmitted without a normal power using only a battery. The unit price of the UEs should be very cheap, and thus it is expected that the price will be about between USD $1 to $2. Only when the UE is very cheap and can be used for several years with only one battery, IosT communication system can be popularized, thereby opening a full-scale IoT era.

However, in the case of IosT communication system based on 3GPP mobile communication system, all UEs of the IosT should have a SIM card mounted thereon for subscriber authentication. The price of the SIM card is approaching $10 and when it's very cheap, the price is about $5, and thus when the SIM card is mounted on an IosT UE, the unit price significantly increases, which is far beyond the target price $1 to $2. Therefore, the competitiveness in the market is lost and thus IosT service based on 3GPP mobile communication network cannot succeed.

SUMMARY OF THE INVENTION

The present invention provides a method of authenticating a subscriber of a cellular IoT device without using a SIM (subscriber identity module) card or USIM (universal subscriber identity module) card, an IoT device for subscriber authentication, and a base station apparatus for subscriber authentication. More particularly, the present invention provides a method of authenticating a subscriber in a cellular IoT device, which distinguishes and authenticates a subscriber by generating, by a base station and an IoT UE, a random code using a random number which may be generated in the same manner simultaneously after synchronization of time and frequency, an IoT device for subscriber authentication, and a base station apparatus for subscriber authentication.

The present invention also provides a method of authenticating a subscriber of a cellular IoT device, which distinguishes and authenticates a subscriber by generating a random code using external factors such as a timing advance value or a frequency offset which are directed to the corresponding UE by the measurement of the base station in the initial base station connection process using PRACH (physical random access channel) defined in 3GPP standard in order to improve the security of a random code, an IoT device for subscriber authentication, and a base station apparatus for subscriber authentication.

In an aspect, a method of authenticating a subscriber of an Internet of Things (IoT) device based on mobile communication is provided. The method includes authenticating the subscriber using a measurement value which becomes a unique characteristic of the IoT device, wherein the authenticating of the subscriber is performed using a measurement value which becomes a unique characteristic of the IoT device without using a SIM (subscriber identity module) card or a USIM (universal subscriber identity module) card.

The measurement value may be mutually shared in the IoT device, a base station and an authentication server, and the IoT device may generate a random code for the subscriber authentication using the measurement value.

The measurement value may include at least one of a timing advance value, a frequency offset, and a traffic volume measurement value.

The authenticating the subscriber may include generating, by the IoT device, a first random code using the measurement value as a generation factor of the first random code and transmitting, by the IoT device, the first random code to the base station.

The authenticating the subscriber may further include restoring a unique identity (ID) of the IoT device using the first random code received by the base station and the generation factor of the first random code and transmitting, by the base station, information for an uplink transmission to the IoT device.

The authenticating the subscriber may further include generating, by the IoT device, a second random code using a measurement value, which becomes a unique characteristic of the IoT device, as a generation factor of the second random code and transmitting, by the IoT device, the second random code to the authentication server through the base station.

After generating a hash value of a same length as the unique ID of the IoT device by using one or a combination of the generation factors, the first random code and the second random code may be generated by an XOR operation of the unique ID of the IoT device and the hash value.

The authenticating the subscriber may further include restoring the unique ID of the IoT device using the second random code received by the authentication server and processing, by the authentication server, an authentication of the IoT device using the unique ID.

After generating a hash value of a same length as the first random code or the second random code by using one or a combination of the generation factors, the unique ID of the IoT device may be restored by an XOR operation of the first random code or the second random code and the hash value.

The method may, before the authenticating the subscriber, further include storing, by the IoT device, the base station, and the authentication server, the unique ID of the IoT device, synchronizing a time between the IoT device and the base station, starting, by the IoT device, a random access process, and calculating, by the base station, the timing advance value and transmitting, by the base station, the timing advance value to the IoT device and the authentication server.

When a timing offset is used as the generation factor of the first random code or the second random code, the generation factor of the random code may be automatically changed by updating the timing offset even after an initial authentication.

After a completion of connection between the IoT device and a mobile communication network, if a number of authentication requests within the IoT device or the mobile communication network exceeds a predetermined number, the connection to the base station may be blocked.

In another aspect, an Internet of Things (IoT)) device for a subscriber authentication based on mobile communication is provided. The IoT device includes a memory configured to store a unique identity (ID) of the IoT device, a transceiver configured to transmit and receive a wireless signal, and a processor configured to be coupled with the transceiver, wherein the processor is configured to use a measurement value, which becomes a unique characteristic of the IoT device, for the subscriber authentication without using a SIM (subscriber identity module) card or a USIM (universal subscriber identity module) card.

In further another aspect, a base station apparatus for a subscriber authentication of Internet of Things (IoT) based on mobile communication is provided. The base station apparatus includes a transceiver configured to transmit and receive a wireless signal and a processor configured to be coupled with the transceiver, wherein the processor is configured to use a measurement value, which becomes a unique characteristic of the IoT device, for the subscriber authentication without using a SIM (subscriber identity module) card or a USIM (universal subscriber identity module) card.

According to a method of authenticating a subscriber in a cellular IoT device, an IoT device for subscriber authentication, and a base station apparatus for subscriber authentication according to the embodiments of the present invention, when operating an IoT device for IoT/IosT service in a communication system (e.g., a 3GPP mobile communication system) similar to a mobile communication system having a network of a star topology form in which a central device such as a base station is connected to a multiple of IoT UEs or IoT devices, a subscriber can be authenticated while maintaining high security without using a SIM card/USIM card including subscriber authentication information. As such, the cost increase issue due to the mounting of SIM card/USIM card on an IoT/IosT UE device, which is expected to become a significant roadblock in the popularization of IoT/IosT service based on the existing 3GPP mobile communication system, can be resolved, and thus a successful business stabilization through the popularization of IoT/IosT service based on 3GPP mobile communication system is possible.

DESCRIPTION OF EXEMPLARY EMBODIMENTS

Figure 1:
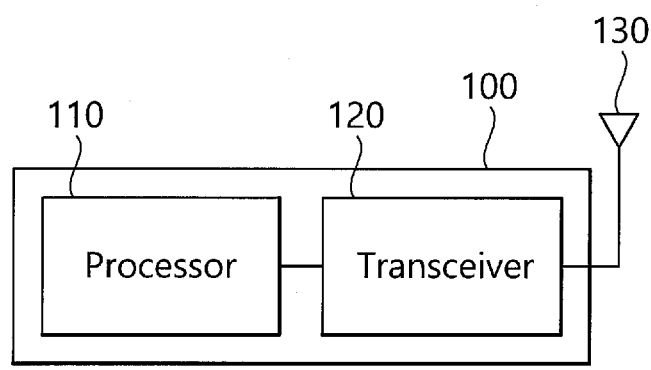
FIG. 1 illustrates an IoT (Internet of Things) device according to an embodiment of the present invention.

The present invention may have various modifications and embodiments, and some specific embodiments are illustrated in the drawings and are described in detailed in the detailed description of the invention. However, the embodiments do not limit the present invention and should be understood as including all changes, equalities and substitutes included in the idea and technology of the present invention.

The terms such as "first" and "second" may be used to describe various embodiments, but the components are not limited by the above terms. The terms are used to only distinguish one component from another. For example, a first component may be called a second component within the scope of the rights of the present invention, and in a similar way, a second component may also be called a first component. The term "and/or" includes a combination of a plurality of items or one or more of a plurality of items.

When it is mentioned that a first component is connected or linked to a second component, the first component may be directly connected or linked to the second component, but there may be a third component between the first component and the second component. On the other hand, when it is mentioned that a first component is directly connected or directly linked to a second component, it should be understood that there is no other component between the first component and the second component.

The terms used in the present application are used to only describe specific embodiments and are not used to limit the scope of the present invention. A singular expression includes a plurality expression unless clearly stated differently. In the present application, the terms such as "include" and "have" are used to designate the existence of the feature, number, step, operation, component, part or a combination thereof disclosed in the specification and should be understood as not excluding the possibility of the existence or addition of one or more other features, numbers, steps, operations, components, parts or a combination thereof.

Unless defined otherwise, all the terms used here including technical or scientific terms have the same meaning as what is generally understood by one of ordinary skill in the art to which the present invention belongs. The terms defined in a generally used dictionary should be construed as having a meaning coinciding with the meaning in the context of the related technology, and unless clearly defined in the present application, the terms should not be understood as an ideally or excessively formal meaning.

A user equipment (UE) may also be referred to as a mobile station (MS), a user terminal (UT), a wireless terminal, an access terminal, a terminal, a fixed or mobile subscriber unit, a subscriber station (SS), a cellular phone, a wireless device, a wireless communication device, a wireless transmit/receive unit (WTRU), a mobile mode, a mobile, a personal digital assistant (PDA), a smartphone, a laptop, a netbook, a personal computer, a wireless sensor, a consumer electronic device (CE), or the like.

Various embodiments of the UE may include a cellular phone, a smartphone having a wireless communication function, a personal digital assistant (PDA) having a wireless communication function, a wireless modem, a portable computer having a wireless communication function, an imaging device such as a digital camera having a wireless communication function, a wearable device having a wireless communication function, a gaming device having a wireless communication function, a music storage and replay home appliance having a wireless communication function, an Internet home appliance allowing wireless Internet access and browsing, and a portable unit or terminal having a combination of such functions, but the present invention is not limited thereto.

A base station generally refers to a fixed point communicating with a UE may include a Node-B, an eNode-B, an advanced base station (ABS), a HR-BS, a site controller, a base transceiver system (BTS), an access point (AP), or an interfacing device of an arbitrary different type operable in a wireless environment, but the present invention is not limited thereto.

Abase station may be a part of a base station controller (BS), a radio network controller (RNC), other base stations such as relay nodes and/or a radio access network which may include network elements (not shown). A base station may be configured to transmit and/or receive wireless signals within a specific geographical area which may be called as a cell (not shown).

Hereinafter, the preferred embodiments of the present invention will be described in detail with reference to the attached drawings, and when describing the embodiments with reference to the attached drawings, the same reference number is used for the same or corresponding component regardless of the symbols in the drawings, and the redundant description thereof will be omitted.

According to the method and apparatus for subscriber authentication in a cellular IoT device of the present invention, a base station and an IoT UE (including an IosT UE) distinguish and authenticate a subscriber by generating a random code which may be simultaneously generated in the same manner after synchronization of time and frequency or a specific digit string or signal of a similar concept with or without measured values defined in 3GPP standards (e.g., a timing advance value, a frequency offset, etc.) as external factors.

Since SIM card/USIM card is not used, IoT UE devices should store UE IE, which is a kind of unique ID (e.g., IMSI, IMEI, or serial number), in the devices themselves. These numbers should be stored in a manner that cannot be deleted or changed by a software approach so as to provide a strong security.

A mobile telecommunication service provider stores information on the corresponding UE ID in an authentication server.

The IoT UE device synchronizes time with the base station via a synchronization process with the base station.

Once synchronized with the base station, the IoT UE device should get permission for access from the base station by performing an RACH (random access channel) process. The latter process of this RACH process corresponds to a process of getting a permission for use by authentication.

The direct transmission of UE ID in the process of authenticating is vulnerable to a hacking, and thus the UE ID is not directly transmitted. Instead, a random code composed of letters and numbers which use the UE ID as input factors is generated so as to be transmitted to an authentication server.

A hash function may be used to maximize the security of the generated random code.

The authentication server generates a UE ID using the same method of generating a random code in an IoT UE device, in which only an input factor and an output factor have been changed respectively to a random code and an UE ID, and allows authentication through the existing 3GPP authentication procedure.

In order to generate the same random code between an authentication server and an IoT UE device, time should be synchronized. The base station and the authentication server have already been synchronized by their own time management scheme. Further, the base station and the IoT UE device are synchronized before the RACH process by the cell synchronization process of the IoT UE device. Hence, it is possible to simultaneously generate the same random number.

Even if the time is synchronized, there may actually be an offset in the time synchronization, and thus a time synchronization margin is secured by maintaining the generated random code for a predetermined time (short time). Further, when authentication for the same random code is requested again within the corresponding time, the authentication of the corresponding IoT UE device is rejected and the state of the UE ID of a specific IoT UE device connected to the corresponding random code is changed to the unusable state so as to refuse a future authentication. In some cases, unusable ID may be designated by one time of the redundant attempt or a certain number of attempts may be set for designation of the unusable ID.

Nevertheless, the above-described method and apparatus use a code which is generated by a predefined random code generation method with a hash function linked to UE ID which is an internal unique ID, and thus when the method of obtaining main information for an IoT UE device and generating a random code is leaked to the outside, it is vulnerable to an external hacking, which is a disadvantage.

In order to resolve such a problem, the unique feature of each IoT UE device (e.g., the timing advance value, frequency offset, etc.) is added as an external factor which is needed for random code generation. For successful authentication, the authentication server should be able to obtain a same value for an external factor which is additionally used for random code generation, and thus an external factor, which may be shared by the base station and the authentication server, is used.

There was a random code generation method based on the unique feature of each UE device, but in this method, all the features of respective UE devices should be tested and obtained before selling the UE device. Moreover, the obtained information should be saved in a server or system related to the authentication, and thus the IoT service, in which thousands or tens of thousands of IoT UE devices are connected to one base station, requires too much memory for saving the corresponding information for all IoT UE devices, thereby increasing the implementation complexity.

In order to overcome this problem, the present invention uses various measured values stated in 3GPP standards as external factors for random code generation. For example, in the case of a timing offset (timing advance value), in the RACH process, the base station can measure the distance with the IoT UE device through a delay time value. A timing offset, which should be adjusted for the advance of transmission time, is supposed to be transmitted to the IoT UE device based on such a time delay. The corresponding information are protected through link protection or Ciphering for the control message of 3GPP, thereby becoming strong against an external hacking. Since a timing offset is transmitted, it may be vulnerable to the hacking in a wireless section. In order to overcome such a disadvantage, the timing offset to be used as a random code generation factor increase the resolution than the transmitted/received timing advance value, thereby strengthening security.

A mobile communication system should perform a process of synchronizing time of the UE device and the base station as the first step for normal communication with the base station and a core network (CN) irrespective of whether the mobile communication system is a synchronous system or an asynchronous system. In the case of the 3GPP LTE, accurate synchronization is performed via a primary synchronization signal (PSS), a secondary synchronization signal (SSS), a system frame number (SFN) included in physical broadcast channel (PBCH)/master information block (MIB), and various timing measurement processes. Hence, the core network (CN), the base station, and the UE may know the same time synchronization or the offset with the reference time of each device, and thus the operation according to the mutually same time is possible. In this case, a certain level of timing offset inevitable exists, but the value is not large.

After the time synchronization, the UE recognizes the most basic parameters of the corresponding base station through the system information block (SIB) data demodulation and finally indicates the existence of the UE itself to the base station through the UL random access channel (RACH) process and requests permission for use. When first attempting to attach the corresponding base station, the UE is authenticated from the base station/CN (core network) in the RACH process.

The UE does not transmit a direct IMSI of the UE in one step of the RACH process and is authenticated by transmitting a value related to the IMSI or a random value. When a random value is transmitted, a few steps of an additional process are added to a general authentication process for the authentication.

All other measurement values, which can be shared by the base station and the UE and become the feature of each UE, as well as external factors of random code generation, which use the timing offset and base station ID and the like, may be used as the generation factor of the random code. For example, there are a traffic volume measurement, a frequency offset, etc. The timing offset value is protected by a control message, and thus only the corresponding IoT UE device, the base station and the authentication server can know the timing offset value, thereby enhancing security. Further, since the frequency offset is not information that is directly exchanged, the security is enhanced. Hence, the security can be maximized by combining such measured values as the random code generation factor so as to be used.

According to an embodiment of the present invention, in order to remove a SIM card/USIM card in IoT, particularly in IosT such as NB-IoT, IMSI is embedded to IoT UE, and for security enhancement, IMSI is once more encoded using the value measured by the actual UE and the base station, such as a frequency offset and a timing offset. In particular, since the frequency offset is not information that is directly transmitted and received by the base station and the UE, the security can be maximized. Namely, in the case of the frequency offset with the hardware type attribute, the base station and the UE know an almost same value without exchanging the frequency offset, but a third party other than the base station and the UE cannot know the value, and thus the security is enhanced.

Specifically, all UEs measure the frequency offset between the base station and the UE in the time synchronization process, and the base station also estimates the frequency offset using PRACH (physical random access channel) preamble. Hence, when the UE transmits PRACH preamble without frequency offset correction, the base station estimates the frequency offset with a value close to the measured frequency offset by the UE itself. Granularity for the frequency offset in consideration of the estimation error is introduced so as to be displayed as a certain number, and the value is used as a generation factor which generates a random code.

In the case of the timing offset, a timing offset is measured between the base station and the UE, and thus it is difficult to measure the value by a third party. In the case of the timing offset, the base station should measure the timing offset and indicate to the UE by wireless transmission, and thus the security may be lowered. To improve this aspect, the random code is continually changed by sometimes updating the change of the timing offset due to the movement of the UE, etc.

According to the embodiments of the present invention, a method and apparatus for subscriber authentication, which maintains the security of the same level as before as CN (core network)/base station and the UE perform authentication based on external factors (e.g., the timing advance value, frequency offset, etc.) or a random number enabling mutual replication generation which are generation factors of the random code without mounting SIM card/USIM card on the IoT UE device in the process of the above described time synchronization and RACH process, is proposed. Further, the security of the authentication process is maximized by reflecting unique hardware attributes or other attributes of each UE device in the generation of the random code. According to the embodiments of the present invention, in order to remove a SIM card/USIM card in IoT, particularly in IosT such as NB-IoT, IMSI is embedded to IoT UE, and for security enhancement, IMSI is once more encoded using the value measured by the actual UE and the base station, such as a frequency offset and a timing offset.

FIG. 1 illustrates the configuration of an IoT (Internet of Things) device (including IosT device) according to an embodiment of the present invention. Referring to FIG. 1, an IoT device 100 is configured with a transceiver 120 for transmitting and receiving a wireless signal, a processor 110 which is coupled with the transceiver and is operated, and a transmission/reception antenna 130.

The transceiver 120 transmit or receives a radio frequency signal to or from the base station through the antenna 130, receives data and a control signal by DL (downlink) from the base station and transmits data and a control signal by UL (uplink) to the base station through the antenna 130. The transceiver 120 may be configured to modulate signals to be transmitted by the antenna 130 and demodulate signals received by the antenna 130.

The processor 110 may determine the point of time for transmitting a control signal by controlling the transceiver 120. Further, the processor 110 performs a process of generating a random code for subscriber authentication.

The processor 110 may be a general-purpose processor, a special-purpose processor, a conventional processor, a digital signal processor (DSP), a microprocessor, one or more microprocessors associated with the DSP core, a controller, a microcontroller, an application specific integrated circuit (ASIC), a field programmable gate array (FPGA) circuit, an integrated circuit (IC), state machine or the like. The processor 110 may perform an arbitrary different function enabling a signal coding, a data processing, power control, an input/output processing, and/or the operation of the UE in a wireless environment. The processor 110 may be coupled with the transceiver 120.

The antenna 130 may be an antenna which is configured to transmit and/or receive RF signals. The antenna 130 may be configured to transmit and/or receive an arbitrary combination of wireless signals.

Figure 2:
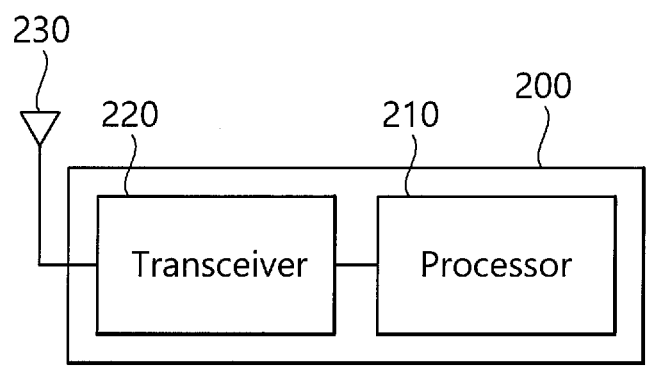
FIG. 2 illustrates a base station apparatus according to an embodiment of the present invention.

FIG. 2 illustrates a base station apparatus according to an embodiment of the present invention. Referring to FIG. 2, the base station apparatus 200 is configured with a transceiver 220, a processor 210, and an antenna 230.

The transceiver 220 transmits or receives a radio frequency signal to or from an IoT device 100 through the antenna 230, transmits data and a control signal by DL to the IoT device 100 through the antenna and receives data and a control signal by UL from the IoT device 100. The transceiver 220 may be configured to modulate signals to be transmitted by the antenna 230 and demodulate signals received by the antenna 230.

The processor 210 may determine the point of time for transmitting a control signal by controlling the transceiver 220. The processor 210 may generate a UE (user equipment) ID from a random code generated in the IoT device 100.

The processor 210 may be a general-purpose processor, a special-purpose processor, a conventional processor, a digital signal processor (DSP), a microprocessor, one or more microprocessors associated with the DSP core, a controller, a microcontroller, an application specific integrated circuit (ASIC), a field programmable gate array (FPGA) circuit, an integrated circuit (IC), state machine or the like. The processor 210 may perform an arbitrary different function enabling a signal coding, a data processing, power control, an input/output processing, and/or the operation of the UE in a wireless environment. The processor 210 may be coupled with the transceiver 220.

Hereinafter, among the above-described various embodiments, a method of authenticating a subscriber which uses a timing offset as a factor for random code generation in an IoT, particularly in an IosT, will be described by steps.

Figure 3:
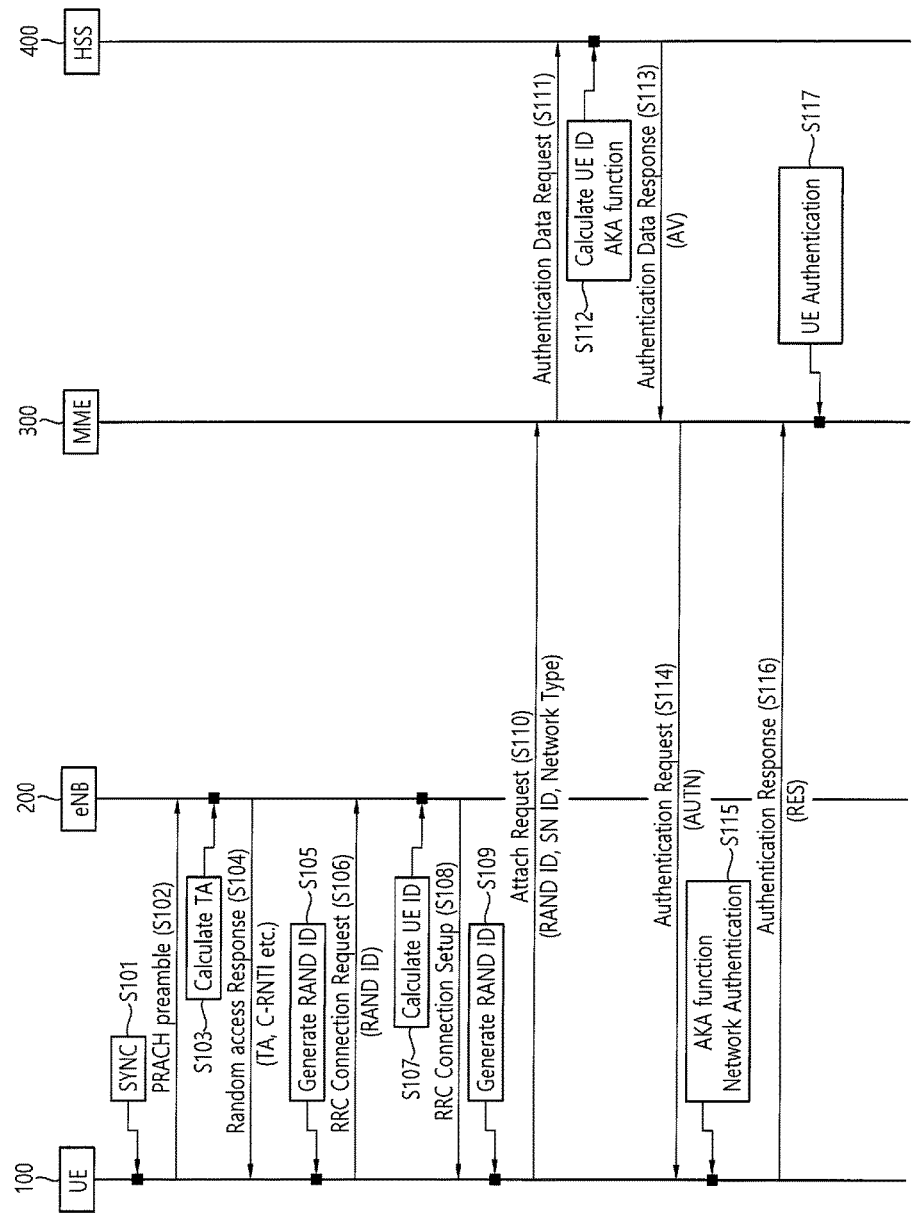
FIG. 3 illustrates an example of an authentication procedure in an initial attach of a cellular IoT device according to an embodiment of the present invention.

FIG. 3 illustrates an example of an authentication procedure when an initial attach of a cellular IoT device (including an IosT device) according to an embodiment of the present invention. Referring to FIG. 3, in the first step, an IoT UE device (hereinafter, referred to as "UE") (UE, 100) stores UE ID, which is the UE's unique ID, in the internal memory of the device. At this time, the UE ID is configured to have the same bit length as IMSI (international mobile subscriber identity). A home subscriber server (HSS) 400, which is the authentication server of the core network (CN), also stores the same UE ID.

In the second step, the UE 100 synchronizes time with the base station (eNB) 200 through the time synchronization process (S101).

In the third step, the UE 100 starts the RACH process by randomly selecting the PRACH preamble code (S102).

In the fourth step, the base station 200 calculates the timing advance value (TA) by measuring the timing offset between the base station 200 and the UE 100 based on the PRACH preamble transmitted by the IoT device 100 (S103).

In the fifth step, the base station 200 stores the calculated timing advance value (TA) and transmits the value to the corresponding UE 100 together with a temporary C-RNTI using a random access response (RAR) (S104). Further, the base station 200 transmits the timing advance value to the core network (CN) (not shown in FIG. 3).

Figure 4:
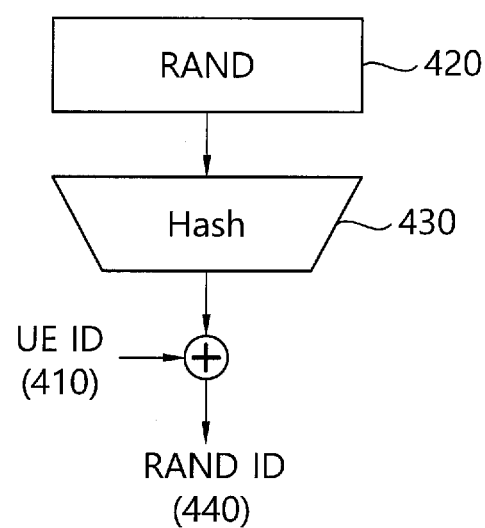
FIG. 4 illustrates a process of converting an UE ID (User Equipment ID) into a random code according to an embodiment of the present invention.

In the sixth step, the UE 100 generates a first random code (RAND ID) by a method promised in advance with the authentication server (HSS) 400 using the received timing advance value (TA) together with currently synchronized various time display values including the stored UE's unique ID (UE ID) and system frame number as random code generation factors. The first random code (RAND ID) may be generated using a hash value for security as illustrated in FIG. 4 (S105).

In the seventh step, the UE 100 transmits the first random code, which is generated using the unique UE ID with a temporary C-RNTI received from the base station 200, to the base station 200 by the UE ID (S106).

Figure 5:
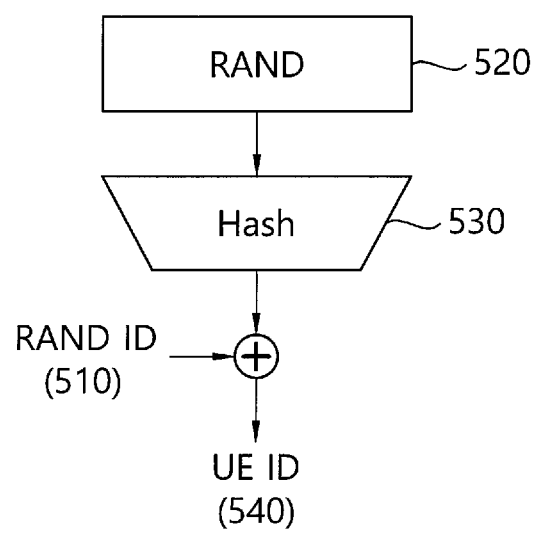
FIG. 5 illustrates a process of deriving an UE ID from a random code according to an embodiment of the present invention.

In the eighth step, restores the UE's unique ID (UE ID) using the received first random code and the timing advance value (TA) as illustrated in FIG. 5 (S107).

In the ninth step, the base station 200 transmits information needed for UL transmission including the final C-RNTI to the UE 100 having transmitted the corresponding temporary C-RNTI (RRC connection step) (S108).

In the tenth step, the UE 100 generates a second random code (RAND ID) using a hash value by the method promised in advance with the authentication server (HSS) 400 as illustrated in FIG. 4 (S109). At this time, a new random code is generated using additional information obtained in the previous data transmission/reception with the base station such as C-RNTI as a generation factor of a random code, thereby enhancing security. When additional information such as C-RNTI is used as a generation factor of a random code, the additional information should be harmonized with the existing LTE GUTI (globally unique temporary identifier) structure such as mobility management entity (MME) ID.

Namely, a random code is generated and used in order to have the same bit number in the position used in the existing UE ID so that the authentication can be successful in the corresponding standard without the change of the standard of the existing 3GPP LTE mobile communication system. Further, in the security communication based on the key defined in other standards, the compatibility issue with the standard may be resolved in a manner that newly generates every time a random code having the same bit number in the position where a permanent or temporary UE IE is necessary or reuses a random code generated at the initial access.

In the eleventh step, the UE 100 transmits an attach request message to a mobility management entity (MME) 300 (S110). The initial authentication of 3GPP is started while the MME 300 receives an attach request message. Information such as UE ID and SN ID (serving network ID) is sent together in the attach request message. At this time, the UE ID uses the above-described second random code and is transmitted in a state that the encryption and integrity are not protected.

In the twelfth step, the MME 300 transmits authentication data request message together with the received second random ID to the HSS 400 (S111).

In the thirteenth step, the HSS 400 drives the UE's unique ID in the received second random code using the same generation factor value by the same method of generating a random code in the UE 100 in which only the input factor and the output factor have been changed to the random code and the UE ID, respectively, as illustrated in FIG. 5 (S112).

In the fourteenth step, the HSS 400 performs an authentication and key agreement (AKA) algorithm by finding the UE's unique key by accessing the authentication center (AuC) using the UE's unique ID. Then the HSS 400 transmits authentication data response message together with the authentication vector (AV), which is the result of performing AKA algorithm, to the MME 300 (S113). AV includes XRES (Expected Response) value and AUTN (authentication token) which are needed for authentication.

In the fifteenth step, the MME 300 transmits the authentication request message together with AUTN, which is a part of the AV, to the UE 100 (S114). AUTN includes the message authentication code (MAC) value to be used for authentication, the sequence number (SQN), and the authentication management field (AMF).

In the sixteenth step, the UE 100 performs AKA algorithm using the received AUTN and compares the generated XMAC (expected message authentication code) value with the MAC value of the received AUTN so as to perform network authentication (S115).

In the seventeenth step, if XMAC value matches with MAC value, the network authentication is successfully completed, and the UE 100 transmits authentication response message together with RES value, which is the result of performing AKA algorithm, to the MME 300 (S116).

Lastly in the eighteenth step, the MME 300 compares RES value received from the UE 100 with XRES value received from HSS 400 so as to perform UE authentication (S117). If RES value matches with XRES value, UE authentication is successfully completed.

FIG. 4 illustrates a process of converting an UE ID (User Equipment ID) into a random code according to an embodiment of the present invention. Referring to FIG. 4, an IoT device generates a hash value 430 of the same length as the UE ID by combining generation factors 420 (e.g., external factors such as a random number, a timing advance value, and a frequency offset) of the random code or by one of the generation factors 420, then the random code 440 may be generated with XOR operation of the UE ID 410 and the hash value 430.

FIG. 5 illustrates a process of deriving an UE ID from a random code according to an embodiment of the present invention.

Referring to FIG. 5, the base station and the authentication server may generate a hash value 530 of the same length as the random code by combining generation factors 520 (e.g., external factors such as a random number, a timing advance value, and a frequency offset) of the random code or by one of the generation factors 520, then the UE ID 540, which is the UE's unique ID, may be generated with XOR operation of the random code 510, which has been transmitted from the IoT device, and the hash value 530.

Even though time is synchronized between the authentication server, the base station, and the IoT UE, there is still a little timing offset, and thus the valid period of the generated random code is predefined so as to perform authentication with the same code within the corresponding valid period. Further, when the authentication for the same random code redundantly occurs, it is regarded as the authentication failure and the service provision may be rejected.

An authentication method which uses the frequency offset is also possible. In this case, the frequency offset value is not transmitted and received between the base station and the UE, and thus it can be said that the security is higher than the case of using the timing offset.

In the embodiment of an authentication method which uses a frequency offset, the frequency offset of the base station and the UE is measured in the second step in the case of the UE and in the fourth step in the case of the base station. The frequency offset values measured by the base station and the UE are almost same, and thus the frequency offset transmission is not necessary in the fifth step. From the sixth step, the frequency offset value held by the mutual measurement is used instead of the timing advance value. It is also possible that the two values are used together.

In the case of IosT, mostly UEs in the form of a sensor are used, thereby substantially not having mobility. Hence, it is difficult for the connected base station to be changed except for the case that an IoT device connected to a specific base station is moved to another base station, and thus the base station ID may also be used as a generation factor in the random code generation algorithm. When the base station ID is changed, the authentication server may add the process of checking that the connection to the corresponding IoT UE has been cancelled to the authentication process through the already connected base station.

In 3GPP standard, the timing offset with the UE is measured again intermittently or periodically even after the initial successful connection between the base station and the UE. Hence, even after the initial authentication, the random code generation factor is automatically changed while updating the timing offset, thereby maximizing security.

Further, in another embodiment of the present invention, when the frequency offset is used as the generation factor of the random code, three problems can be assumed.

First, an attack may be attempted by a birthday attack. The birthday attach is an attack based on a birthday paradox. If a full search is performed by the number of times as many as $\sqrt{2}$ of the possible number of cases, the probability of obtaining a desired value exceeds 50%. In the case of IoT communication which uses mobile communication, the bandwidth is 200 kHz, and thus the number of cases that the length of the generated random code is about 8 bits is $2^8$ in consideration of the estimation error. This has a weakness that it can be easily estimated by the birthday attack. Hence, in order to overcome the weakness, in the present invention, even after the connection between the UE and the network is completed, if an approach for authentication to the network is sensed, the connection may be blocked and it may be configured to be usable only after authentication through a new base station.

Secondly, the frequency offset can be estimated using SDR (software defined radio) equipment. The SDR equipment is wireless transmission/reception equipment based on software and can enable a signal of a desired frequency band to approach a mobile communication service by only software control. Hence, this equipment is approachable to both the UE and the base station, and security therefor is required. In order to resolve this issue, after the connection between the UE and the network is completed, if an approach of requesting another authentication to the UE or network is sensed, the connection may be blocked and it may be configured to be usable only after authentication through a new base station as described above.

Lastly, the accuracy of the estimable frequency offset is $\frac{1}{1000}$ of the bandwidth, and the error may be about 200 Hz. If the frequency offset is smaller than 200 Hz, the accuracy issue on the frequency offset between the UE and the base station occurs. In the present invention, at the time of RACH process, this issue may be resolved by intentionally giving a frequency offset greater than the error.

In the present invention, all other measurement values, which may be shared between the base station and the UE and become the feature of each UE, as well as the timing offset (timing advance value) and the frequency offset, which have been described as the random code generation factor, may be used as the generation factor of the random code. Further, such factors may be used in a sole or combination form.

Various embodiments of the present invention have been described above. Nevertheless, the above description is illustrative and does not limit the scope of the present invention defined by the scope of the following claims. Hence, other embodiments may be within the scope of the following claims, and various modifications may be made within the scope of the present invention. Additionally, some of the above-described steps may be performed in an order other than the described order.

What is claimed is:

1. A method of authenticating a subscriber of an Internet of Things (IoT) device based on mobile communication, the method comprising:
   generating, by the IoT device, one or more random codes or one or more random IDs (identifications) for a subscriber authentication using a measurement value;
   transmitting, by the IoT device, the generated one or more random codes or one or more random IDs (identifications) to a base station or an authentication server;
   authenticating the subscriber using the measurement value, which becomes a unique characteristic of the IoT device;
   wherein the measurement value is mutually shared in the IoT device, the base station, and the authentication server, and
   wherein the authenticating of the subscriber is performed using the measurement value without using a SIM (subscriber identity module) card or a USIM (universal subscriber identity module) card.

2. The method of claim 1, wherein the measurement value comprises at least one of a timing advance value, a frequency offset, and a traffic volume measurement.

3. The method of claim 1, wherein the authenticating the subscriber comprises:
   generating, by the IoT device, a first random code using the measurement value as a generation factor of the first random code: and
   transmitting, by the IoT device, the first random code to the base station.

4. The method of claim 3, wherein the authenticating the subscriber further comprises:
   restoring a unique identity (ID) of the IoT device using the first random code received by the base station and the generation factor of the first random code; and
   transmitting, by the base station, information for an uplink transmission to the IoT device.

5. The method of claim 4, wherein the authenticating the subscriber further comprises:
   generating, by the IoT device, a second random code using a measurement value, which becomes a unique characteristic of the IoT device, as a generation factor of the second random code; and
   transmitting, by the IoT device, the second random code to the authentication server through the base station.

6. The method of claim 5, wherein, after generating a hash value of a same length as the unique ID of the IoT device by using one or a combination of the generation factors, the first random code and the second random code are generated by an XOR operation of the unique ID of the IoT device and the hash value.

7. The method of claim 6, wherein the authenticating the subscriber further comprises:
   restoring the unique ID of the IoT device using the second random code received by the authentication server; and
   processing, by the authentication server, an authentication of the IoT device using the unique ID.

8. The method of claim 7, wherein, after generating a hash value of a same length as the first random code or the second random code by using one or a combination of the generation factors, the unique ID of the IoT device is restored by an XOR operation of the first random code or the second random code and the hash value.

9. The method of claim 8, before the authenticating the subscriber, further comprising:
   storing, by the IoT device, the base station, and the authentication server, the unique ID of the IoT device;
   synchronizing a time between the IoT device and the base station;
   starting, by the IoT device, a random access process; and
   after calculating the timing advance value, transmitting, by the base station, the timing advance value to the IoT device and the authentication server.

10. The method of claim 9, wherein, when a timing offset is used as the generation factor of the first random code or the second random code, the generation factor of the random code is automatically changed by updating the timing offset even after an initial authentication.

11. The method of claim 10, wherein, after a completion of connection between the IoT device and a mobile communication network, if a number of authentication requests within the IoT device or the mobile communication network exceeds a predetermined number, the connection to the base station is blocked.

12. An Internet of Things (IoT) device for a subscriber authentication based on mobile communication, the IoT device comprising:
   a memory configured to store a unique identity (ID) of the IoT device;
   a transceiver configured to transmit and receive a wireless signal; and
   a processor configured to be coupled with the transceiver,
   wherein the processor is configured to generate one or more random codes or one or more random IDs (identifications) for the subscriber authentication using a measurement value,
   wherein the processor is further configured to transmit the generated one or more random codes or one or more random IDs (identifications) to a base station or an authentication server,
   wherein the processor is further configured to use the measurement value, which becomes a unique characteristic of the IoT device, for the subscriber authentication without using a SIM (subscriber identity module) card or a USIM (universal subscriber identity module) card, and
   wherein the measurement value is mutually shared in the IoT device, the base station, and the authentication server.

13. A base station apparatus for a subscriber authentication of an Internet of Things (IoT) device based on mobile communication, the base station apparatus comprising:
   a transceiver configured to transmit and receive a wireless signal; and
   a processor configured to be coupled with the transceiver,
   wherein the processor is configured to use a measurement value, which becomes a unique characteristic of the IoT device, for the subscriber authentication without using a SIM (subscriber identity module) card or a USIM (universal subscriber identity module) card,
   wherein one or more random codes or one or more random IDs (identifications) for the subscriber authentication are generated by using the measurement value,
   wherein the generated one or more random codes or one or more random IDs (identifications) are received by the base station or are transmitted to an authentication server, and
   wherein the measurement value is mutually shared in the IoT device, the base station, and the authentication server.

\* \* \* \* \*